United States Patent
Domsalla

(10) Patent No.: US 10,775,970 B2
(45) Date of Patent: Sep. 15, 2020

(54) CLIENT SIDE FRAMEWORK REUTILIZATION OF A CLIENT SESSION

(71) Applicant: SAP SE, Walldorf (DE)

(72) Inventor: Thorsten Domsalla, Mannheim (DE)

(73) Assignee: SAP SE, Walldorf (DE)

( * ) Notice: Subject to any disclaimer, the term of this patent is extended or adjusted under 35 U.S.C. 154(b) by 220 days.

(21) Appl. No.: 15/961,341

(22) Filed: Apr. 24, 2018

(65) Prior Publication Data

US 2019/0324607 A1   Oct. 24, 2019

(51) Int. Cl.

| | | |
|---|---|---|
| *G06F 3/048* | (2013.01) | |
| *G06F 3/0483* | (2013.01) | |
| *G06F 3/0482* | (2013.01) | |
| *G06F 3/0484* | (2013.01) | |
| *H04L 29/08* | (2006.01) | |

(52) U.S. Cl.
CPC .......... *G06F 3/0483* (2013.01); *G06F 3/0482* (2013.01); *G06F 3/04842* (2013.01); *H04L 67/34* (2013.01)

(58) Field of Classification Search
CPC ......... G06F 3/04842; G06F 8/38; G06F 9/451
See application file for complete search history.

(56) References Cited

U.S. PATENT DOCUMENTS

| | | | | |
|---|---|---|---|---|
| 6,826,540 B1* | 11/2004 | Plantec | ................. | G06Q 30/02 705/7.32 |
| 9,251,372 B1* | 2/2016 | Lahoz | ................. | G06F 21/6245 |
| 10,122,611 B2* | 11/2018 | Kumar | ................. | H04L 41/22 |
| 2007/0256003 A1* | 11/2007 | Wagoner | ............... | G06F 16/958 715/205 |
| 2009/0083655 A1* | 3/2009 | Beharie | ................. | G06F 3/0481 715/781 |
| 2012/0158521 A1* | 6/2012 | McCullen | ............. | G06F 16/972 705/14.69 |
| 2013/0046855 A1* | 2/2013 | Jiang | ....................... | H04L 67/10 709/218 |
| 2013/0103736 A1* | 4/2013 | Domsalla | ................ | H04L 67/02 709/203 |
| 2014/0059599 A1* | 2/2014 | Sirpal | ..................... | H04L 51/32 725/37 |
| 2014/0109115 A1* | 4/2014 | Low | ........................ | G06F 9/541 719/328 |

(Continued)

OTHER PUBLICATIONS

Persistent iframe in Background, Apr. 9, 2010, pp. 1-2 https://groups.google.com/a/chromium.org/forum/#!topic/chromium-extensions/us2cUTZI5ws.*

(Continued)

*Primary Examiner* — Scott T Baderman
*Assistant Examiner* — Mario M Velez-Lopez
(74) *Attorney, Agent, or Firm* — Sterne, Kessler, Goldstein & Fox P.L.L.C.

(57) ABSTRACT

Disclosed herein are system, method, and computer program product embodiments for optimizing the performance of a launchpad that launches web-client applications. Maintaining requisite MIME files for a standardized web framework within a single iframe and launching subsequent applications within that iframe can improve the performance of the launchpad. The MIME files may persist within the single iframe across the suite of applications, and further downloading of files as the user launches further applications in the suite of applications may not be required.

20 Claims, 6 Drawing Sheets

(56) References Cited

U.S. PATENT DOCUMENTS

2015/0193835 A1* 7/2015 Nayudu ................. G06Q 30/00
                                                  705/14.73
2017/0011379 A1* 1/2017 Kouru .................... G06Q 20/10

OTHER PUBLICATIONS

Tutorial Republic :HTML iFrame, Jun. 17, 2017, pp. 1-2 (http://www.tutorialrepublic.com/html-tutorial/html-iframes.php).*

* cited by examiner

CLIENT SIDE FRAMEWORK REUTILIZATION OF A CLIENT SESSION

BACKGROUND

Generally speaking, an organization or individual may utilize a suite of software applications employing a standardized web framework. The software applications may comprise client-server computer programs that provide a wide-array of functionalities for businesses and individuals. By developing and grouping the applications in the standardized web framework, a uniform look and feel may be deployed and the behavior of the applications controlled. Furthermore, a standardized web framework may make deployment easier and streamline application development.

The user experience may be improved through the creation of a launchpad, i.e., a consolidated entry point from which to initialize and launch these software applications. A launchpad may include a subset of applications contained in the suite of software applications and can be configurable and personalized. The launchpad may further display content across a myriad of device types in a consistent, familiar manner.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments described herein.

In the drawings, like reference numbers generally indicate identical or similar elements. Additionally, generally, the left-most digit(s) of a reference number identifies the drawing in which the reference number first appears.

DETAILED DESCRIPTION

Figure 1:
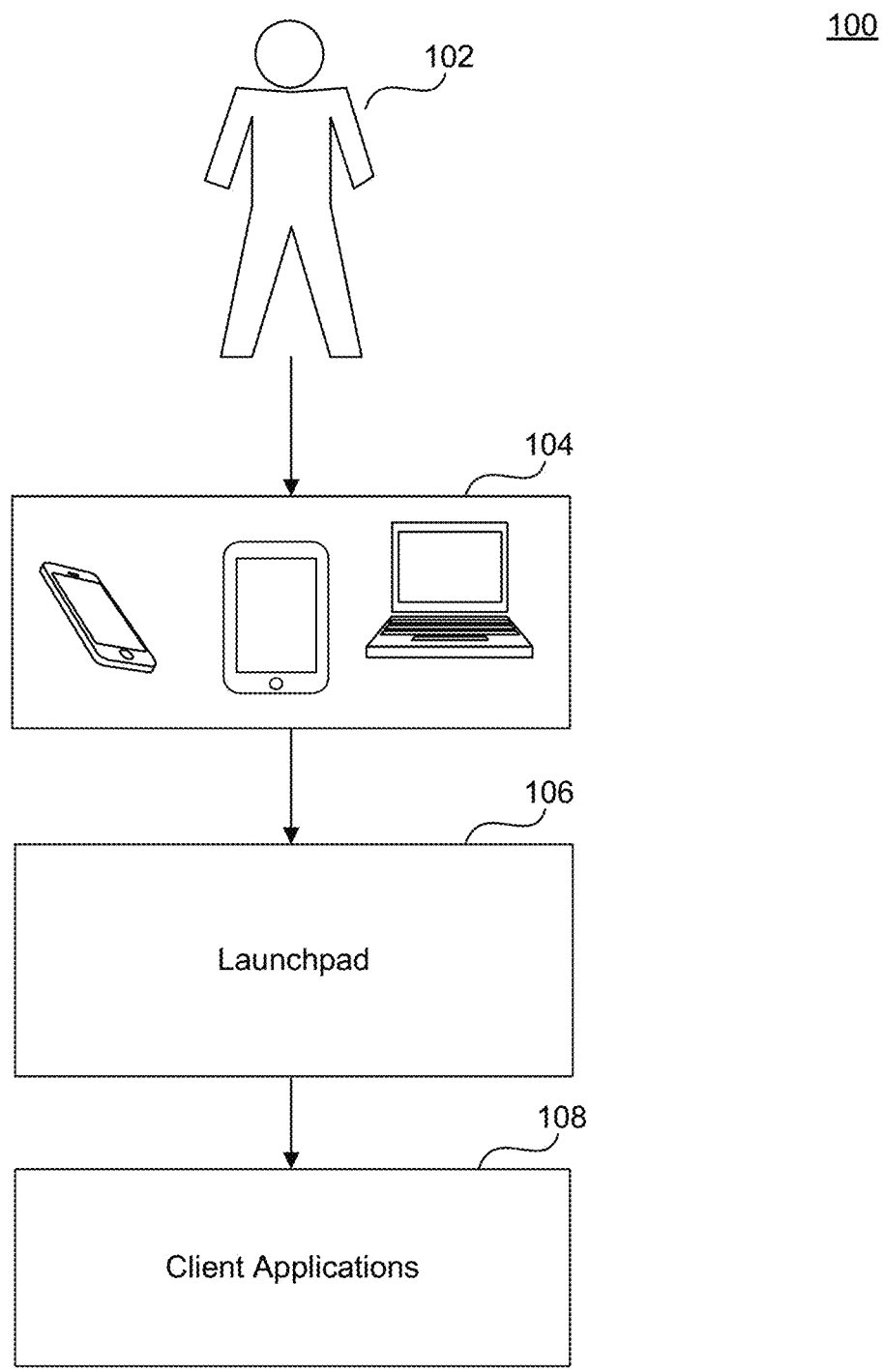
FIG. 1 is a block diagram of a user experience including a launchpad and a suite of client applications, according to some embodiments.

Provided herein are system, apparatus, device, method and/or computer program product embodiments, and/or combinations and sub-combinations thereof, for optimizing the performance of a launchpad that launches web-client applications.

A launchpad may be a default page or home page that displays in a web browser. The launchpad may contain the applications favored by a user as well as supporting navigational functionalities, personalization, support, configuration tools, etc. The launchpad may display a home page comprising tiles, wherein each tile may further display status indicators reflecting the underlying application. Moreover, each tile may launch the application when a user clicks or otherwise inputs upon on the tile. The launchpad may itself be a web application, and the default address of a web browser may point to the launchpad so that the launchpad displays by default when a user opens their web browser. The launchpad's versatility and ubiquity may require specialized solutions for coordinating and launching the various applications available in the suite of software applications. To ensure a high-quality user experience, these solutions may be highly optimized and efficient.

The launchpad may be customized or personalized by the user to contain a desired subset of applications, to arrange the applications in the desired fashion, to display a personalized color scheme, skin, font type, etc., and in other suitable fashions. Customization may be conducted via a specialized screen or configuration tool. The available applications may be changed, updated, or deleted. For example, a user may choose to have one particular application display on their launchpad, remove an application from their launchpad, change the order in which the tiles/applications display in the launchpad, or adjust the layout in other suitable fashions. The user may configure their launchpad, but in an alternate embodiment, an administrator may determine the configuration for a user or a group of users. The configuration capabilities may allow customized themes, skins, or other suitable branding for the launchpad. Thus, the user may additionally configure color, fonts, etc. to fully customize the look and feel of their launchpad.

The launchpad may be implemented using responsive web design to ensure that the pages render effectively on various devices and screen sizes. Thus, the launchpad may adapt to the screen size of the device utilized by a viewing user. Furthermore, the launchpad may hide applications in the suite of applications that are not supported by an accessing device. Tiles for frequently used applications may be visually prioritized in the interface through opaqueness, color indicators, status flags, or other suitable visual clues over tiles for infrequently used applications. Also, a launchpad may provide search capabilities, allowing a user to search for relevant applications, files, emails, etc.

The suite of applications may comprise a wide-array of web-based applications. Such applications may span multitudinous services and industries. For example, and without limitation, web applications may include customer relationship management tools, enterprise resource planning tools, word processing applications, communication applications, product lifecycle management tools, supply chain management, general business solutions, and many other types of applications. The web-based applications may not be limited only to business needs and may be applications utilized by individuals for entertainment, personal, financial, or any other purposes. A user or business may develop their own web applications for utilization within the launchpad and access their custom applications via the launchpad.

Standardizing the web framework, i.e. the standard method of building and deploying the applications in the suite of applications, may bring substantial benefits and gains, as will be appreciated by one skilled in the relevant art(s). Such gains may be varied and far-reaching but include a reduction in errors, simplified code, shorter development time, and heightened security, to name just some examples. The standardized web framework may contain various MIME files including images, Javascript files, Cascading Style Sheets (CSS), videos, and other appropriate content files. By harmonizing the MIME files needed by web applications using the standardized web framework, the behavior of the applications may be coordinated. Moreover, development of applications may be streamlined. For example, a developer of an application to be contained in the suite of applications may gain familiarity with the MIME files available in the standardized web framework and tailor their web applications to utilize only the methods and styles contained in those files.

The MIME files contained within a standardized web framework may grow to be very large. Moreover, the MIME files may need to be downloaded for each web application in the suite of applications launched from the launchpad. This may take a significant amount of time and cause a user to experience delays when initializing or launching an application from their launchpad. However, maintaining the requisite MIME files within a single iframe and launching subsequent applications within that iframe may mitigate this performance inefficiency. In such embodiments, the needed MIME files persist within the single iframe across the suite of applications, and further downloading is not required. This maintaining of the single iframe may be sometimes referred to herein as client-side reutilization (CSR).

FIG. 1 is a block diagram of a user experience 100, according to some embodiments. Any operation herein may be performed by any type of structure in the diagram, such as a module or dedicated device, in hardware, software, or any combination thereof. Any block in FIG. 1 may be regarded as a module, apparatus, dedicated device, general-purpose processor, engine, state machine, application, functional element, or related technology capable of and configured to perform its corresponding operation(s) described herein. User experience 100 includes user 102, devices 104, launchpad 106, and client applications 108.

User 102 may be an individual or entity using a suite of software applications. User 102 may be a member of a business, organization, or other suitable group using software tailored for the functions performed by that organization. User 102 may be an individual using the software applications for personal reasons or pursuits. The software applications utilized by user 102 may be any suitable web-based application, as described in further detail below.

Devices 104 may be cellphones, smartphones, tablet computers, laptop computers, desktop computers, web browsers, wearables, appliances, internet of things (IoT) devices, or any other computing devices. Devices 104 may communicate with launchpad 106 via a network, which may include a LAN, WAN, the Internet, or other public network. Devices 104 may have different capabilities and screen sizes. For example, a cell phone may have a smaller screen than a desktop computer. Moreover, different devices 104 may support different client applications. For example, a mobile application may only function on a mobile device and not on a desktop computer.

Launchpad 106 may be thought of as a landing page, home page, front page, or home screen, i.e., a personalized, role-based user-interface client enabling a user to access a suite of software applications. In addition to the software applications utilized by the user, launchpad 106 may contain supporting navigational functionalities, personalization, support, configuration tools, etc. Launchpad 106 may display tiles, and each tile may further display a status indicator pertinent to the underlying, associated application. For example, if the client application is an email tool, the status indictor may display the number of unread messages. Moreover, each tile may launch an application when clicked or otherwise selected. An exemplary illustration of launchpad 106 may be viewed in FIGS. 2A-2C and is further elaborated upon in the description of these screen displays below.

Client applications 108 may be a myriad of web-based applications. Client applications 108 may be developed and deployed using a variety of technologies and web frameworks. Client applications 108 may meet and serve diverse requirements. Client applications 108 may be housed on a remote server and delivered over a network to user 102. More than one application in client applications 108 may reside on the same remote server, or client applications 108 may exist on different servers. User 102 may interact with client applications 108 through a web browser or interface such as Chrome, Firefox, etc. User 102 may also interact with client applications 108 through a mobile application, desktop application, or other suitable module. Client applications 108 may include dynamic interactions with users through user input and data processing, but not necessarily so. Client applications 108 may serve a particular function, purpose, or goal, but not necessarily so. Client applications 108 may interact through inputs with user 102, but client applications 108 may merely relay information without receiving inputs from user 102. The breadth of functionality provided by client applications 108, i.e. web applications, will be appreciated by one skilled in the relevant art(s) to be expansive and inclusive.

Launchpad 106 may deploy client applications 108 that utilize a standardized web framework. The standardized web framework may contain various MIME files including images, Javascript files, CSS, videos, and other appropriate content files used across client applications 108. For example, the Javascript files used by one application in client applications 108 may be available to other applications in client applications 108. Client applications 108 may utilize identical CSS, thereby providing a standardized look and feel across applications in client applications 108.

Efficiency gains may be achieved by launchpad 106 when launchpad 106 launches client applications 108 within a single iframe and maintains the single iframe across client applications 108. Thus, subsequent client applications 108 may avoid downloading anew the MIME files required by the standardized web framework. Instead, in some embodiments, only the first launched application in client applications 108 downloads the MIME files, and subsequently initialized client applications 108 may launch in the same iframe. From the perspective of user 102, subsequently launched client applications 108 may load faster than client applications 108 that download the standardized web framework upon each application launch.

In order to utilize CSR client applications 108 may be written to adhere to the appropriate standardized web framework and to communicate with launchpad 106 in appropriate ways. Client applications 108 may be configured to achieve the requisite standardization. For example, client applications 108 may initialize and determine if CSR is active using functions and methods. Additional functions may handle a termination of the application that occurs within the application (e.g., through a log-out button within client applications 108) or a termination of the application that occurs externally (e.g., through behavior conducted by user 102 on launchpad 106). Client applications 108 may also use a post-message function in order to effectively communicate with launchpad 106.

Similarly, the behavior of launchpad 106 may be specified via appropriate member functions. For instance, one such function may check if CSR is active and enabled in the system. Another function may create an iframe when client applications 108 launch. Launchpad 106 may communicate with client applications 108 via, for example, a post_message( ) function, or if CSR is not enabled, via a request_URL( ) function. The post_message( ) function may make use of a window.postMessage( ) function allowing for cross-origin communication between window objects, i.e. launchpad 106 and client applications 108.

Launchpad 106 may include client applications 108 that do not adhere to the appropriate standardized web framework. In some embodiments, for such client applications 108, CSR is not be enabled. When client applications 108 are launched, launchpad 106 may do so via URL, opening a new tab or window and downloading the MIME files. In such a situation, it is possible that efficiency gains may not be achieved.

Figure 2A:
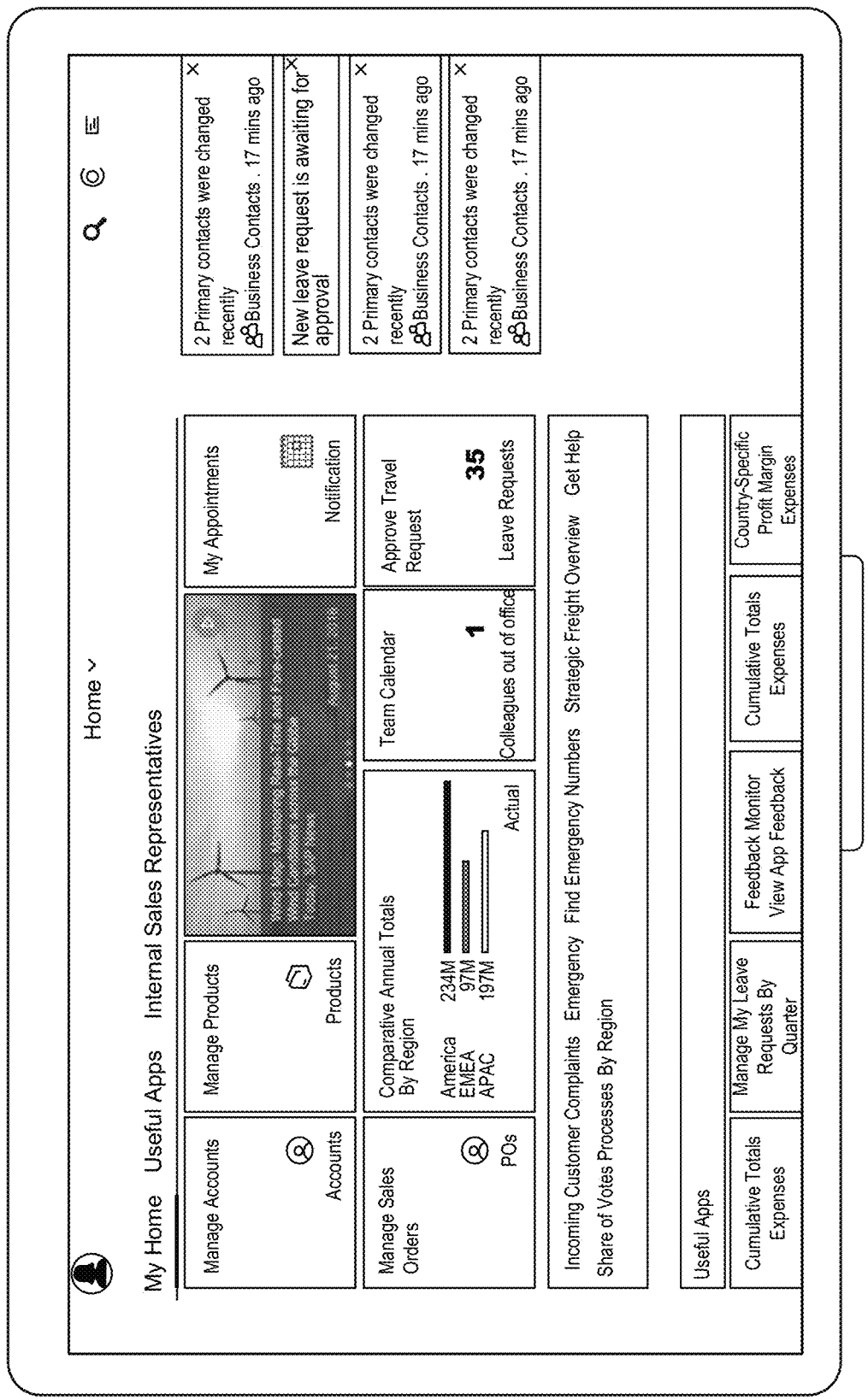
FIGS. 2A-2C are example screen displays of an exemplary launchpad for a suite of client applications, according to some embodiments.
Figure 2C:
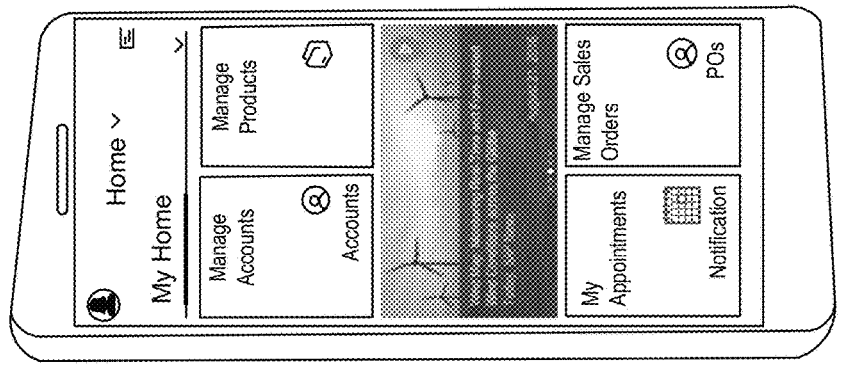
Figure 2B:
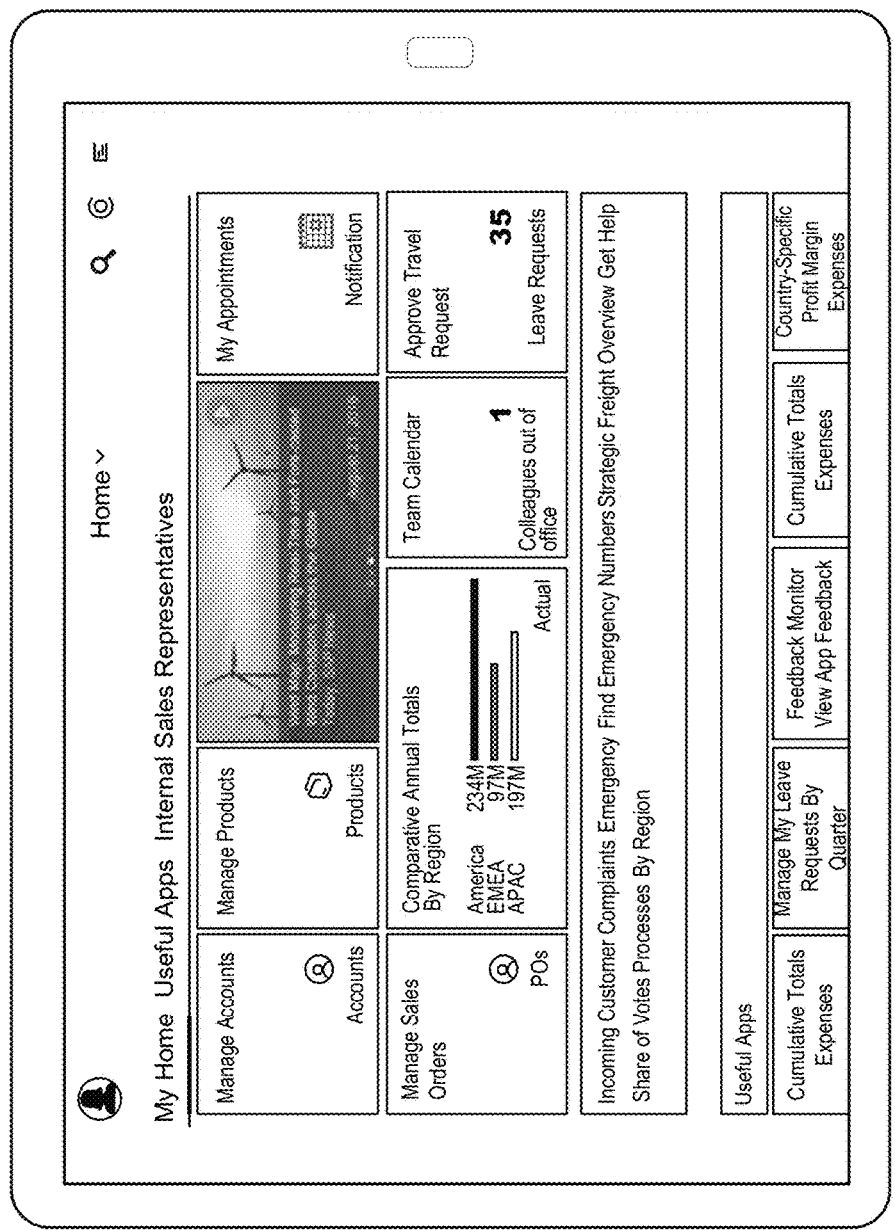

FIGS. 2A-2C are screen displays of an exemplary launchpad for a suite of client applications 108, according to some embodiments. FIGS. 2A-2C reflect various example versions of launchpad 106 as viewed by disparate devices 104. FIG. 2A reflects an exemplary version of launchpad 106 for viewing by user 102 from a desktop computer. FIG. 2B reflects an exemplary version of launchpad 106 for viewing from a tablet device. FIG. 2C reflects an exemplary version of launchpad 106 for viewing from a mobile phone device. One skilled in the art(s) will appreciate that the different screen sizes and available capabilities across these devices may present difficulties in rendering an appropriate launchpad 106. Moreover, certain client applications 108 may not function on particular device in devices 104.

Figure 3:
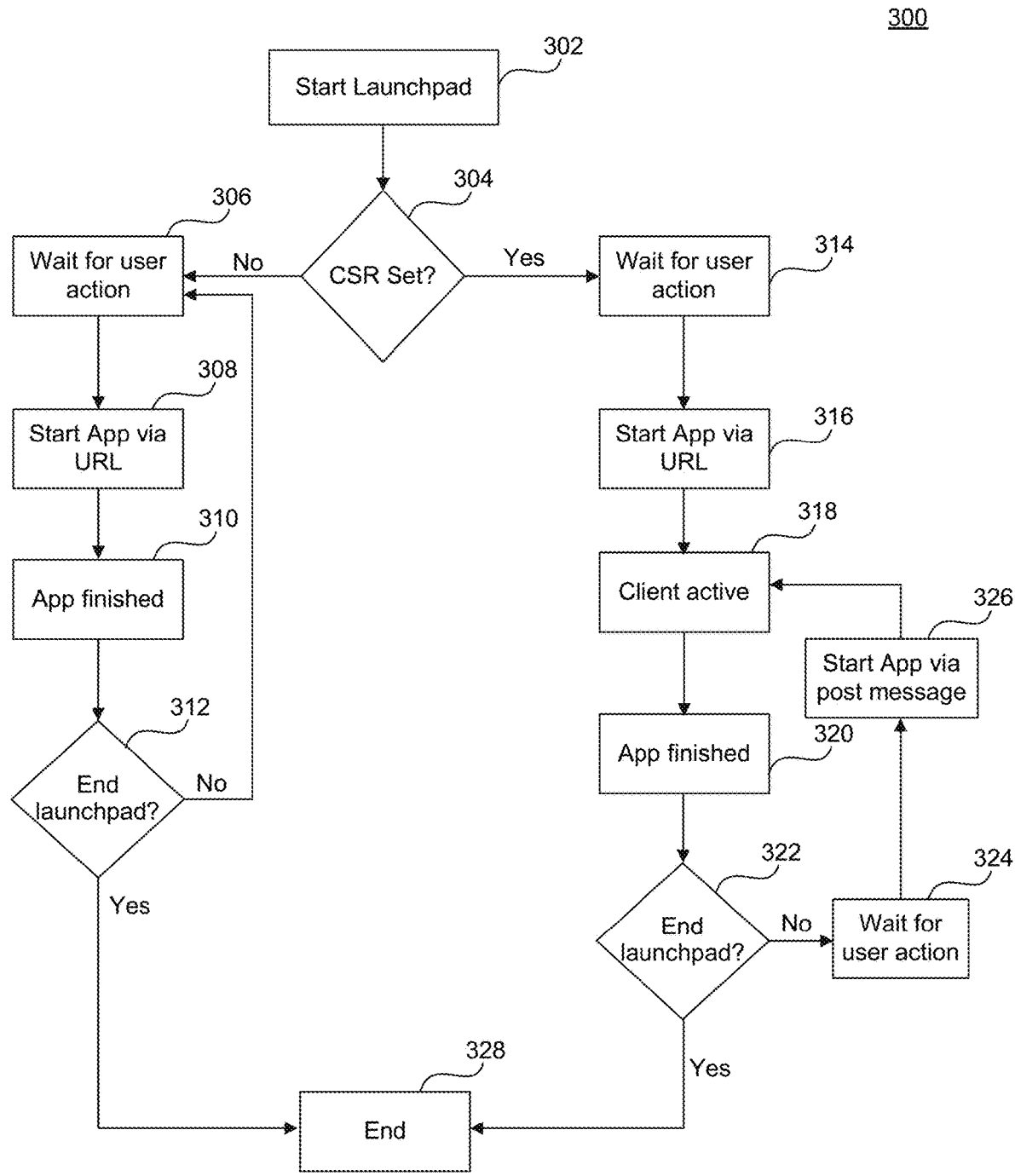
FIG. 3 is a flowchart illustrating a method in a launchpad for starting a client application, according to some embodiments.

FIG. 3 is a flowchart illustrating a method in launchpad 106 for starting a client application, according to some embodiments. Method 300 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art(s).

In 302, launchpad 106 initializes. Launchpad 106 may commence when user 102 launches a browser and enters the web address of launchpad 106. A web browser may have the default page set to the address relevant to launchpad 106 so that launchpad 106 displays immediately upon browser launch. Launchpad 106 may further be accessed through the launching of a mobile application if devices 104 are mobile devices.

In 304, launchpad 106 may determine if CSR is set for an application in client applications 108. In an embodiment, in order for CSR to be set, client applications 108 may utilize the standardized web framework. If application in client applications 108 does not utilize the standardized web framework, then launchpad 106 may not reutilize a previously launched iframe. CSR may further be enabled/disabled entirely for launchpad 106. Thus, client applications 108 may utilize CSR if CSR is enabled, or function without CSR if CSR is disabled. Accordingly, if CSR is not set, method 300 proceeds to 306. If CSR is set, then method 300 proceeds to 314.

In 306, launchpad 106 may wait for a command. Such a command may come as a user action from user 102. The command may be a click on a tile. The command may be any other suitable user-input gesture such as tapping, swiping, mouse pointer hovering, keyboard input, audio command, or any other suitable input command indicating an application in client applications 108 to launch. As would be appreciated by a person of ordinary skill in the art(s), user 102 may express intent using various other mechanisms. In 306, launchpad 106 may wait to receive such an action.

In 308, launchpad 106 starts client applications 108 using a URL. Launchpad 106 may launch a new tab or window using a window.open( ) method. A string may indicate the URL of the resource, i.e., an application in client applications 108, to be loaded in the window. This URL may reflect the application selected and launched in 306. The URL may additionally include appropriate parameters utilized by the selected application in client applications 108. A window name and window features may further be included when launching client applications 108.

In 310, launchpad 106 may receive a signal indicating completion of client applications 108. In one embodiment, this notification comes from client applications 108. In this embodiment, user 102 inputs within client applications 108 to indicate termination. In an alternate embodiment, launchpad 106 may receive the signal to terminate the application from within launchpad 106, e.g., through a user input on a logout button. In 310, launchpad 106 may close the iframe or window in which client applications 108 run.

In 312, launchpad 106 determines if user 102 closes launchpad 106. If launchpad 106 is closed, then method 300 proceeds to 328 and ends. However, if launchpad 106 is not closed, then method 300 returns to 306 to await further user action, e.g., launching of a second application in client applications 108.

Referring back to step 304, if CSR is determined to be set or enabled, then 314 is performed. In 314, launchpad 106 waits for a command. A command may be a user action from user 102 in launchpad 106. The user action may be a click of a tile or any other suitable user-input command such as tapping, swiping, hovering with a mouse pointer, keyboard input, audible control, or any other suitable input gesture indicating a particular client application to launch. As would be appreciated by a person of ordinary skill in the art(s), user 102 may act using various other mechanisms. In 314, launchpad 106 may wait to receive such an action.

In 316, launchpad 106 starts client applications 108 via URL. Launchpad 106 may launch an iframe using a window.open( ) method. A string may indicate the URL of the resource to be loaded in the window. This URL may reflect client applications 108 selected in 306. The URL may include appropriate parameters required by the selected application. A window name and window features may further be included when launching client applications 108.

In 318, launchpad 106 maintains a client active session in the iframe. User 102 may utilize the functionality provided by client applications 108 and interact with client applications 108. Client applications 108 may receive transmissions in asynchronous Javascript (AJAX) via post_message( ) or other suitable function. Accordingly, in some embodiments, client applications 108 may not require a full page reload to complete operations and to interact with user 102.

In 320, launchpad 106 receives a completion indicator of client applications 108. In one embodiment, this signal comes from client applications 108. In this embodiment, user 102 inputs within client applications 108 to indicate termination. In an alternate embodiment, launchpad 106 may receive the completion indicator to terminate the application from launchpad 106, perhaps through an input on a logout button. In 320, launchpad 106 may not close the iframe in which client applications 108 had been running. Instead, the iframe persists and the MIME files contained therein may persist as well. The iframe may be hidden from view by setting a visibility attribute, resized to a zero height and zero width, or moved off screen. Thus, to user 102 the iframe (and client applications 108) may disappear. However, the iframe and its contents may persist in memory.

In 322, method 300 determines if user 102 closes launchpad 106. If launchpad 106 is closed, then method 300 proceeds to 328 and method 300 finishes. However, if launchpad 106 persists, then method 300 proceeds to 324 to await further user action, e.g., launching of another application in client applications 108.

In 324, launchpad 106 waits for a command. The command may be a user action in launchpad 106. Such a user action may come from user 102. The user action may be a click of a tile or any other suitable user-input gesture such as tapping, swiping, hovering with a mouse pointer, keyboard input, or any other suitable input gesture indicating an application in client applications 108 to launch. In 324, launchpad 106 may wait to receive such an action.

In 326, launchpad 106 may launch a second application in client applications 108 via a post-message function. This may be the same application launched previously, i.e., it is not necessarily a different application. Launchpad 106 may use window.postMessage( ) to send a message together with a URL to client applications 108. This is to be contrasted with 316, where method 300 may start the client application via URL, i.e., window.open( ). Because launchpad 106 may start the second-selected application in client applications 108 via a post-message, the iframe may not need to be reloaded and the contents of the iframe, which has remained hidden, may be available for utilization by the second-selected application in client applications 108. The post-message function may further set the iframe to no longer be hidden, or return it to the screen so that, from the perspective of user 102, the iframe is being created anew. However, this iframe may be the same iframe that was created in 316. Because client applications 108 utilize the standardized web framework, communicate similarly with launchpad 106, and utilize AJAX for interactions with users, the functions, CSS, etc. may remain available to any CSR-enabled client applications 108.

Figure 4:
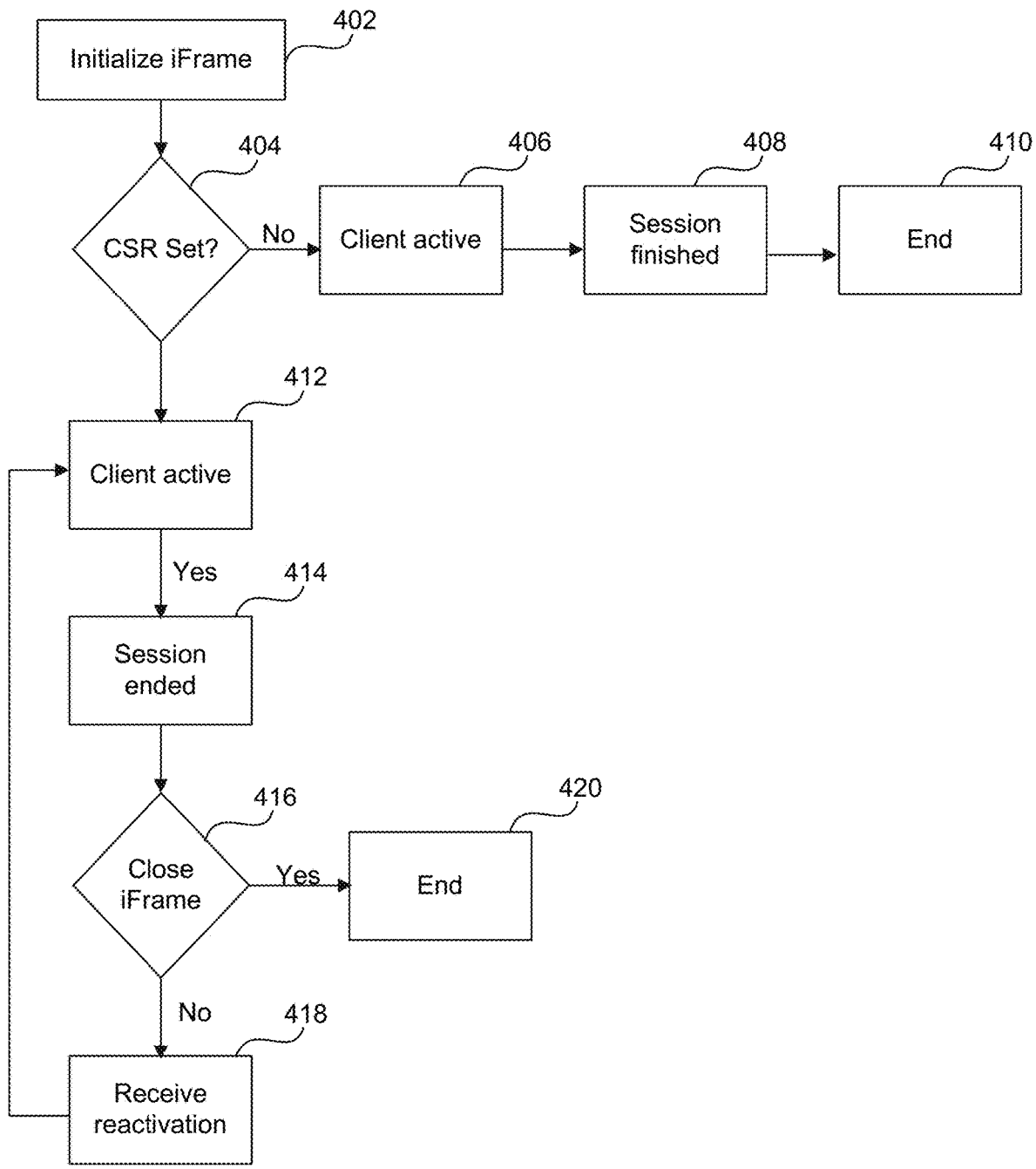
FIG. 4 is a flowchart illustrating a method for running a client application launched from a launchpad, according to some embodiments.

FIG. 4 is a flowchart illustrating a method for running client applications 108 launched from launchpad 106, according to some embodiments. Method 400 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, client applications 108 may initialize within an iframe. Client applications 108 may download the Javascript, CSS, and other MIME files required by the standardized web framework.

In 404, client applications 108 may determine if CSR is enabled. If the standardized web framework is not utilized by client applications 108, then launchpad 106 may not recycle a previously launched iframe. Accordingly, if CSR is disabled, method 400 proceeds to 406. If CSR is enabled, then method 400 proceeds to 414.

In 406, client applications 108 may maintain a client active session in the iframe. User 102 may utilize functionality provided by client applications 108.

In 408, client applications 108 may receive a signal indicating that client applications 108 should close. In one embodiment, this notification comes from within client applications 108. In this embodiment, user 102 provides commands within client applications 108 to terminate client applications 108. Client applications 108 may receive the signal to terminate the application from launchpad 106, perhaps through a user input on a logout button in launchpad 106. In 410, method 400 ends.

In 412, client applications 108 may maintain a client active session in the iframe. User 102 may utilize the functionality provided by client applications 108. Client applications 108 may receive transmissions in asynchronous Javascript (AJAX) via post_message( ) or other suitable function. Accordingly, client applications 108 may not require a full page reload to complete operations.

In 414, client applications 108 may receive a signal indicating completion of client applications 108. In one embodiment, user 102 indicates within client applications 108 that the application may close. Client applications 108 may receive the signal to close from launchpad 106, perhaps through a user input on a logout button.

In 416, client applications 108 determines if the iframe should close. Such a situation may arise when user 102 closes launchpad 106. If launchpad 106 is closing the iframe, then method 400 proceeds to end 420 and method 400 is finished. However, if launchpad 106 persists and the iframe is not closing, then method 400 proceeds to 418 to await further user action, i.e., launching of another application in client applications 108.

In 418, client applications 108 reactivate. Launchpad 106 may launch another application in client applications 108 or launch of the same application in client applications 108. In either case, method 400 returns to 412 with the client active. The iframe may be set to display (i.e., not hidden), relocated to the screen, or otherwise re-rendered. Thus, from the perspective of user 102, the iframe is created anew. As discussed above, the launching of the second application and the return to client active 412 may takes less time than the launching of the initial client application because the standardized web framework may already in place and does not need to be downloaded.

Figure 5:
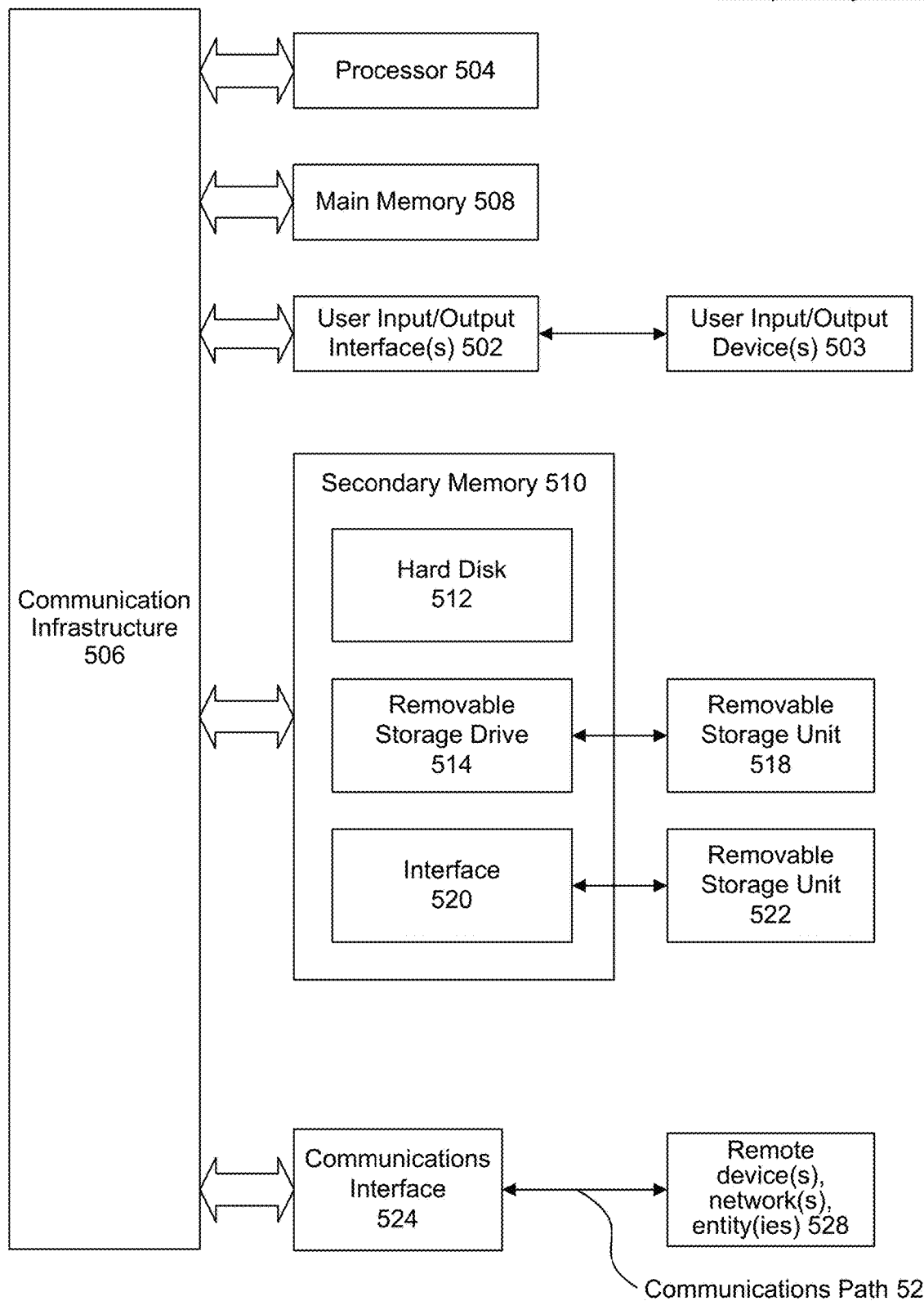
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure or bus 506 through user input/output interface(s) 502.

One or more of processors 504 may be a graphics processing unit (GPU). A GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main or primary memory 508 may include one or more levels of cache. Main or primary memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main or primary memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments may operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system, comprising:
a memory; and
at least one processor coupled to the memory and configured to:
display a launchpad comprising a plurality of client applications, wherein each client application utilizes a standardized web framework;
receive a first command to start a first client application;
launch the first client application in a persistent iframe;
receive a termination indicator for the first client application;
terminate the first client application while maintaining the persistent iframe and the standardized web framework contained in the persistent iframe by setting a visibility attribute for the persistent iframe to hidden;
receive a second command to start a second client application; and
launch the second client application in the persistent iframe and reset the visibility attribute for the persistent iframe to visible.

2. The system of claim 1, wherein to launch the first client application, the at least one processor is further configured to:
download the standardized web framework, wherein the standardized web framework comprises javascript and cascading style sheets utilized by the client applications.

3. The system of claim 1, wherein the at least one processor is further configured to:
render the client applications as tiles in the launchpad, wherein each tile contains a status indicator reflective of an associated client application.

4. The system of claim 3, wherein to display the launchpad, the at least one processor is further configured to:
determine a screen size of a device viewing the launchpad; and
render the tiles in the launchpad based on the determined screen size.

5. The system of claim 1, wherein to launch the second client application, the at least one processor further configured to:
use a post message function to send a message comprising a URL to the second client application.

6. The system of claim 1, wherein to terminate the first client application while maintaining the persistent iframe, the at least one processor is further configured to:
set a width attribute and a height attribute for the persistent iframe to zero.

7. A computer-implemented method, comprising:
displaying a launchpad comprising a plurality of client applications, wherein each client application utilizes a standardized web framework;
receiving a first command to start a first client application;
launching the first client application in a persistent iframe;
receiving a termination indicator for the first client application;
terminating the first client application while maintaining the persistent iframe and the standardized web framework contained in the persistent iframe by setting a visibility attribute for the persistent iframe to hidden;
receiving a second command to start a second client application;
launching the second client application in the persistent iframe and resetting the visibility attribute for the persistent iframe to visible; and
wherein at least one of the displaying, receiving, launching, and terminating are performed by one or more computers.

8. The method of claim 7, the launching the first client application further comprising:
downloading the standardized web framework, wherein the standardized web framework comprises javascript and cascading style sheets utilized by the client applications.

9. The method of claim 7, further comprising:
rendering the client applications as tiles in the launchpad, wherein each tile contains a status indicator reflective of an associated client application.

10. The method of claim 9, the displaying the launchpad further comprising:
determining a screen size of a device viewing the launchpad; and
rendering the tiles in the launchpad based on the determined screen size.

11. The method of claim 7, the launching a second client application further comprising:
using a post message function to send a message comprising a URL to the second client application.

12. The method of claim 7, the maintaining the persistent iframe further comprising:
setting a width attribute and a height attribute for the persistent iframe to zero.

13. A non-transitory computer-readable device having instructions stored thereon that, when executed by at least one computing device, cause the at least one computing device to perform operations comprising:
displaying a launchpad comprising a plurality of client applications, wherein each client application utilizes a standardized web framework;
receiving a first command to start a first client application;
launching the first client application in a persistent iframe;
receiving a termination indicator for the first client application;
terminating the first client application while maintaining the persistent iframe and the standardized web framework contained in the persistent iframe setting a width attribute and a height attribute for the persistent iframe to zero;
receiving a second command to start a second client application;
launching the second client application in the persistent iframe.

14. The non-transitory computer-readable device of claim 13, the launching the first client application further comprising:
downloading the standardized web framework, wherein the standardized web framework comprises javascript and cascading style sheets utilized by the client applications.

15. The non-transitory computer-readable device of claim 13, the operations further comprising:

rendering the client applications as tiles in the launchpad, wherein each tile contain a status indicator reflective of an associated client application.

16. The non-transitory computer-readable device of claim 15, the rendering the client applications further comprising:
   determining a screen size of a device viewing the launchpad; and
   rendering the tiles in the launchpad based on the determined screen size.

17. The non-transitory computer-readable device of claim 13, the maintaining the persistent iframe further comprising:
   setting a visibility attribute for the persistent iframe to hidden.

18. The non-transitory computer-readable device of claim 13, the launching the second client application further comprising:
   resetting the visibility attribute for the persistent iframe to visible.

19. The non-transitory computer-readable device of claim 13, the operations further comprising:
   using a post message function to send a message comprising a URL to the second client application.

20. The non-transitory computer-readable device of claim 13, the launching the second client application further comprising:
   resetting the width attribute and the height attribute for the persistent iframe to a non-zero value.

* * * * *